Patented Jan. 25, 1949

2,460,177

UNITED STATES PATENT OFFICE 2,460,177

PRESERVING SYNTHETIC RUBBER

Louis H. Howland, Waterbury, Conn., assignor to United States Rubber Company, New York, N. Y., a corporation of New Jersey No Drawing. Application June 12, 1945, Serial No. 599,118

3 Claims. (Cl. 260—86.5)

This invention relates to the preservation of certain synthetic rubbers, namely, those which on ageing, especially at elevated temperatures, tend to progressively copolymerize further or cyclicize, thereby hardening (resinifying) and being liable to cracking.

Such rubbers are the rubber-like diene-vinyl copolymers typified by GRS, the rubber-like copolymer of butadiene-1,3 and styrene, and GRA the rubber-like copolymer of butadiene-1,3 and acrylonitrile. The invention may also be applied to the preservation of those copolymers which are more resinous and less elastic due to variation in the proportion of the vinyl component.

The deterioration of diene-vinyl copolymers presents problems not encountered with ordinary rubber or rubber-like synthetics like elastic polyisobutylene, because so far as I am aware the latter do not resinify or harden due to continued polymerization or cyclicization on the mill. Hence a number of rubber antioxidants which functionally are polymerization inhibitors are not useful for preventing hardening, especially during processing on the mill of the unvulcanized diene-vinyl copolymer.

An object of this invention is to provide preservatives for the synthetic rubber-like materials which will effectively prevent the deterioration of such materials by atmospheric oxygen, heat, or light. A further object is to provide a class of compounds which may be added to white or light colored synthetic rubber stocks without producing bad discoloration when the compositions containing them are exposed to the action of sunlight. A still further object is to provide chemicals which protect the unvulcanized diene-vinyl copolymers against the deleterious effect of heat when such polymers are subjected to elevated temperatures during processing. Another object is to provide chemicals which have special and outstanding properties in connection with the preservation of the diene-vinyl copolymers. Still other objects will be apparent from the following description.

I have discovered that the objects of the invention can be accomplished by incorporating with the diene-vinyl copolymer, an aliphatic thioamide of the structure

where R is an aliphatic hydrocarbon group. Preferably R is methyl as illustrated by thioacetamide.

Exemplary of such chemicals are the following: thioacetamide, thiopropionamide, thiobutyramide, thiovaleramide, thiocaproamide, thiolauramide, thiostearamide, thiovinylacetamide, thiocrotonamide.

The unvulcanized diene-vinyl copolymers containing compounds of this invention are unusually resistant to deterioration when subjected to relatively high temperatures during processing or when exposed to atmospheric oxygen over extended periods of time.

The chemicals may be made by any of the methods known to the art.

The proportion of the chemical preservative or antioxidant may be suited to the particular stock and usually is used in the same proportions that conventional rubber antioxidants are used. The proportions are generally 0.5 to 5 parts per 100 parts by weight of the copolymer.

The following examples illustrate the invention, the parts being by weight:

*Example I*

| | A | B |
|---|---|---|
| Unstabilized copolymer | 100 | 100 |
| Thioacetamide | 2.0 | |

The stocks were aged in a 212° F. oven for 48 hours. At the end of that time the control stock had become resinified and had a hard surface which cracked on bending. The stock containing thioacetamide was soft and unresinified, and could be bent without cracking.

*Example II*

A white synthetic rubber composition containing by weight 100 parts of unstabilized butadiene-styrene copolymer, 10 parts of zinc oxide, 60 parts of lithopone, 5 parts of paraffin oil, 2 parts of sulfur, 60 parts of whiting, and 2 parts of mercaptobenzothiazole was divided into two parts (stocks C and D). Stock D has added to it 2 parts of thioacetamide per 100 parts of copolymer. These mixes were mold-cured for 90 minutes at 45 pounds steam pressure. The samples of the resulting stocks were exposed to the action of sunlight under a glass cover for 7 days. The stocks showed practically no discoloration after this treatment. Thus it is shown that these deterioration inhibitors are suitable for use in white or light colored stocks.

The deterioration inhibitors of the invention may be used alone in a synthetic rubber composition or may be mixed with other preservatives, fillers, accelerators, vulcanizing agents or compounding agents of any sort known to the art, The components of the synthetic rubber composition may be used in various ratios and it is not intended to limit the invention to the amounts of ingredients indicated in the examples given.

The age resistors of the invention may be incorporated into synthetic rubber by milling or similar process, or by mixing with the synthetic rubber latex before coagulation, or application thereof may be made to the surface of the crude polymer or of the vulcanized product.

Synthetic rubber goods of various description may have their useful life prolonged by the practice of this invention including tubes, hose, wire, insulation, boots and shoes, surgical instruments, drug sundries, dipped synthetic rubber articles, vehicle tires, etc.

Having thus described my invention, what I claim and desire to protect by Letters Patent is:

1. A rubber-like conjugated dienehydrocarbon-vinyl copolymer selected from the class consisting of 1,3-butadiene-styrene, and 1,3-butadiene-acrylonitrile copolymers containing by weight from 0.5 part to 5 parts, based on 100 parts of the copolymer, of thioacetamide.

2. A rubbery 1,3-butadiene-styrene copolymer containing by weight from 0.5 part to 5 parts, based on 100 parts of the copolymer, of a chemical of the formula

where R is an open-chain saturated aliphatic hydrocarbon radical.

3. A rubbery 1,3-butadiene-vinyl copolymer selected from the class consisting of 1,3-butadiene-styrene, and 1,3-butadiene-acrylonitrile copolymers containing by weight from 0.5 part to 5 parts, based on 100 parts of the copolymer, of an aliphatic thioamide of the formula

where R is an open-chain saturated aliphatic hydrocarbon radical.

LOUIS H. HOWLAND.

REFERENCES CITED

The following references are of record in the file of this patent:

UNITED STATES PATENTS

| Number | Name | Date |
| --- | --- | --- |
| 2,168,847 | Raiston | Aug. 8, 1939 |
| 2,415,356 | Kellog et al. | Feb. 4, 1947 |
| 2,444,881 | Sterrett | July 6, 1948 |